Figure 1:
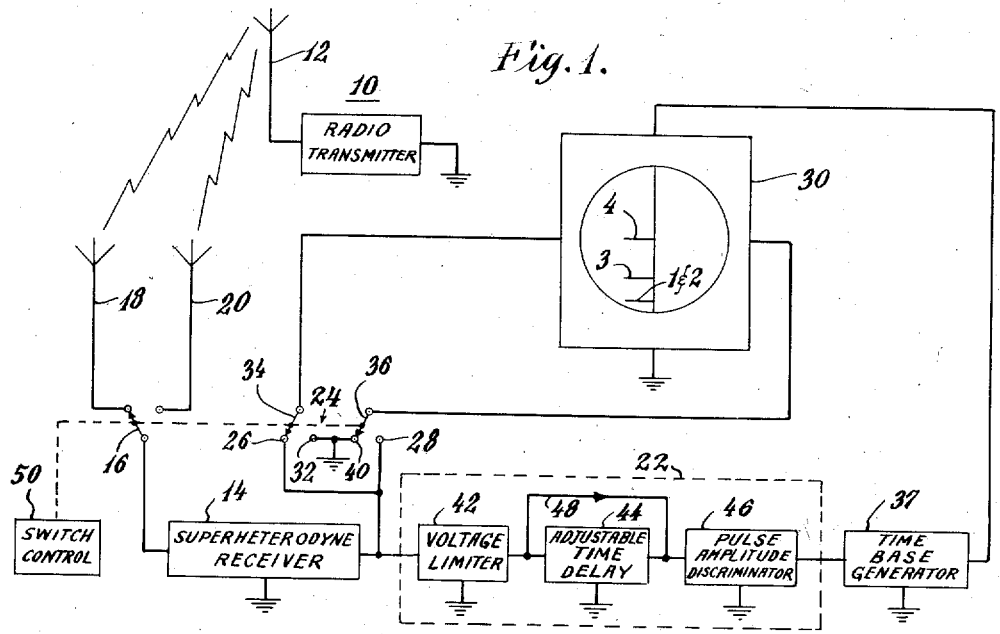

July 1, 1958  L. G. W. KNOTT  2,841,787
RADIO LOCATING APPARATUS
Filed May 8, 1953

INVENTOR.
L. G. W. Knott.
BY
Churchill, Rich, Weymouth & Engel
ATTORNEYS

United States Patent Office 2,841,787
Patented July 1, 1958

2,841,787
RADIO LOCATING APPARATUS

Leonard George Walter Knott, Hanwell, London, England, assignor to Ultra Electric, Inc., Wilmington, Del., a corporation of Delaware Application May 8, 1953, Serial No. 353,870

Claims priority, application Great Britain May 8, 1952

8 Claims. (Cl. 343—101)

This invention relates to the art of radio location. More specifically the invention is related to that form of radio location wherein a transmitter is provided to define a given point or geographic position which it is desired to locate and complementary receiving apparatus is provided which may be carried by a searching vehicle such as an air or surface craft or the like.

Radio locating apparatus of the above type can be particularly useful in locating persons lost at sea when the person is provided with the transmitter, for example, as part of his life saving equipment. In such situations a search craft provided with the proper receiving equipment can intercept the transmitted signals and utilize them for the purpose of "homing" on the victim.

Attempts have been made in the past to provide radio locating apparatus of the above type. One such system employs a cathode ray tube at the receiver for providing a display which can be read by the operator in terms of direction to the transmitter. A time base circuit controls the movement of the cathode ray beam along one axis, for example, the Y-axis. The received signal is arranged to cause deflection of the beam along the other axis of the tube, in this case the X-axis. In the operation of such equipment it is essential that the radio receiver be operated at maximum sensitivity. As is well known, such operation is accompanied by considerable "noise" due to atmospheric disturbances, tube noise, and the like. This "noise" shows up on the cathode ray tube as random traces which are commonly referred to as "grass." To provide a readable signal on the display tube which is not masked by the "grass," the known system employs a transmitter capable of sending out a pulse signal having a repetition rate of the order of 30,000 pulses per second. The time base at the receiver is operated at a constant frequency which is low relative to the pulse repetition rate of the transmitter. Since there is no synchronization between the time base and the received signals, the display on the tube screen appears as an area of light.

A consideration of the above will show that the transmitter, for the given mode of receiver operation, must operate at a high pulse rate. If the pulse rate were decreased so as to approach the frequency of the time base, the few pulses appearing on the tube screen due to the received signal would be indistinguishable from the "grass." This, however, is a considerable drawback when the equipment is intended for sea rescue. Operation of the transmitter at a high pulse rate requires an enormous quantity of electrical energy. This either results in limited life of the transmitter or necessitates the provision of an extremely large battery or power pack.

The present invention has as its general object to overcome the above disadvantages while providing accurate and reliable search apparatus of the aforesaid type.

According to the invention novel receiving equipment is provided which is capable of operating in conjunction with, and thus permits the use of, a transmitter arranged to have a pulse repetition rate in the neighborhood of 200 to 1,000 pulses per second.

The receiver of the present invention is arranged so that the time base is operated in synchronism with the transmitter and thus gives rise to repeated "writing" on the same portion of the tube screen providing a cumulative display which is readily distinguished from the "grass."

Figure 2:
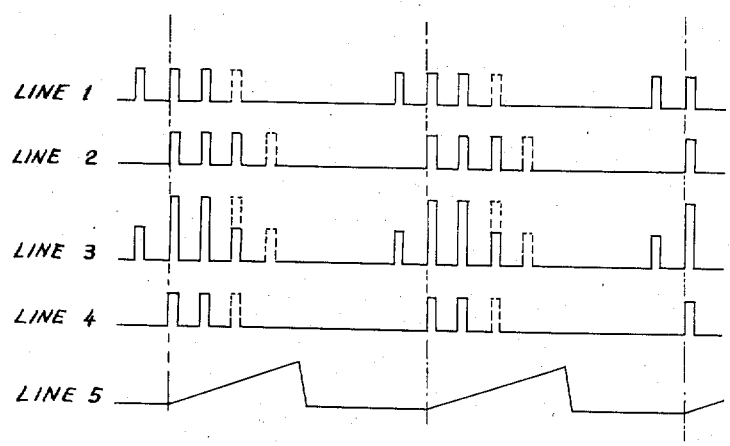
Figure 3:
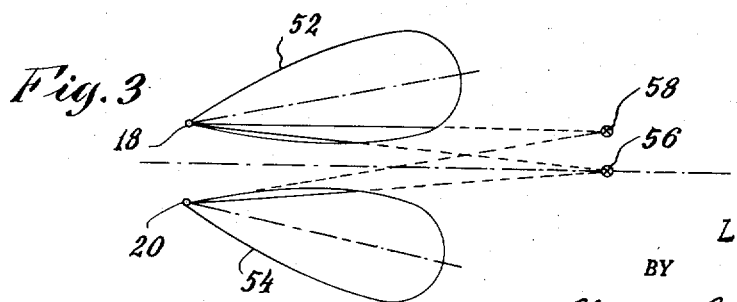

The invention will be better understood after reading the following description in connection with the accompanying drawings in which:

Figure 1 illustrates in block diagram form the basic components of the transmitter and receiver as well as the various interconnections;

Fig. 2 comprises a series of curves illustrating wave shapes at various points in the apparatus; and Fig. 3 is a diagrammatic illustration of typical field patterns of the antennas employed by the receiving equipment.

Referring now to Figure 1, the reference character 10 designates means for transmitting a radio pulse signal such as a self-controlled transmitter which, it will be assumed, is located at some unknown point, perhaps in the hands of someone lost at sea. The transmitter is battery operated and designed, when energized, to send out spaced groups of short pulses of radio frequency energy. A typical pulse envelope is shown in the first line of Fig. 2. It is believed that the choice of suitable apparatus for emitting the illustrated wave train will be well within the knowledge of those persons familiar with the art to which this invention appertains and, therefore, a detailed description is being omitted. In addition to the required wave train the transmitter need only employ a radio frequency carrier whose frequency is sufficiently high to provide line-of-sight transmission.

As shown, the transmitting means includes an antenna 12 which may take the form of a vertical rod, or the like.

The receiving means consists of a conventional superheterodyne type of receiver 14 arranged to have its input connected alternately by means of switch 16 to one or the other of antennas 18 and 20. The output of the receiver 14 is coupled over a first path to a time base synchronizing circuit included within the dashed lines 22, and over a second path to terminals 26 and 28 of a switching device 24.

A display device is provided in the form of a cathode ray oscilloscope 30. As illustrated, the oscilloscope 30 is provided with means for deflecting its beam along both the X-axis and the Y-axis. Deflection along the Y-axis is controlled by the output from a triggered time base generator 37, which, in turn, is controlled by the output from the synchronizing circuit 22.

The generator 37 should be of the type which responds to an input triggering pulse to produce a single cycle of a sawtooth voltage wave and then remains dormant until the next triggering pulse is received. These circuits are well known and therefore are not described in detail. Such circuits also have the quality of remaining insensitive to triggering pulses received during a sawtooth wave producing cycle.

Deflection along the X-axis is controlled by the output from receiver 14 applied to the oscilloscope 30 through switching device 24. As shown one terminal of the X-axis deflection means is connected to switch element 34 while the other terminal of the deflection means is connected to switch element 36. Switch element 34 is arranged to selectively engage terminal 26 or a second terminal 32. Similarly switch element 36 selectively engages terminal 28 or another terminal 40. Terminals 32 and 40 are connected together and to ground or any other point of reference potential.

The switch elements 34 and 36 are ganged together as well as being ganged with switch 16. With the switches in the position illustrated, antenna 18 is connected to the receiver 14 while the output of the receiver is connected to the left side of the oscilloscope, the right side being grounded. It should be understood that reference to the right and left side of the oscilloscope is purely for the purpose of simplifying the description and is intended to refer to the direction in which the beam is deflected along the X-axis. Therefore, when a pulse is received by antenna 18 it will show up on the screen of the oscilloscope as a trace or line originating at the Y-axis and extending toward the left parallel to the X-axis.

When the switches are operated to their alternative position, antenna 20 will be connected to the receiver and any signal it picks up will cause a deflection of the beam towards the right of the Y-axis. Thus, it can be seen that means are provided for visually comparing the strength of the signals intercepted by the respective antennas.

Referring now to the time base synchronizing circuit, it comprises a voltage limiter 42, an adjustable time delay circuit 44, and a pulse amplitude discriminator 46, connected in series in that order. In addition, the output of the voltage limiter 42 is connected directly over path 48 to the input of the pulse discriminator 46. Each of the circuits shown in the boxes 42, 44 and 46, as well as their interconnections are believed to be well known. The delay circuit, for example, may consist of a delay line of any suitable construction, whereas the voltage limiter and pulse discriminator may comprise suitably biased amplifier stages. Path 48 passes signals only in the direction of the arrow to prevent feedback and ringing of the time delay circuit. It should be understood that the drawing consists of a highly simplified schematic drawing.

Finally, reference is made to switch control means 50 for operating the switches 16 and 24. The means 50 could take the form of a motor, assuming that the switches, illustrated diagrammatically, are of the mechanical type. However, the switching may obviously be performed electronically wherein means 50 might take the form of an oscillator, for example.

Briefly, Fig. 3 will be referred to while the method employed to provide "homing" information is described. The two antennas 18 and 20, previously described in connection with Figure 1, are shown diagrammatically in Fig. 3. They are so constructed, employing well known techniques, that their field patterns will be as shown by the respective curves 52 and 54. Assume, for example, that the remote transmitter is located at point 56 relative to the two receiving antennas. As shown, the strength of the signals provided by each antenna will be equal. If, however, the remote transmitter is off to one side such as at point 58, the signal provided by antenna 18 will be much stronger than that provided by antenna 20. Knowledge of which antenna is providing the stronger signal will provide the relative direction of the remote transmitter. As stated above, the relative lengths of the respective traces on the oscilloscope screen will provide such information.

The operation of the equipment will now be described with reference to Fig. 2. As stated above, the remote transmitting means 10 is arranged to emit spaced groups of pulses as shown in line 1 of Figure 2. These are intercepted by one of the two antennas at the receiver and applied to the superheterodyne receiver 14. The output of receiver 14, also represented by line 1, is applied to the voltage limiter 42 which serves to provide an output of constant amplitude. The output of the limiter 42 is applied directly to the pulse discriminator 46 and also through the delay circuit 44 to the discriminator 46. The delay introduced by circuit 44 is adjusted to be equal to the interval between successive pulses in a given group. Thus the output of circuit 44 is as shown in line 2. The input to the discriminator 46 consists of the sum of the delayed and undelayed pulses and therefore is as shown in line 3. The pulse amplitude discriminator 46 is arranged to pass only those pulses which exceed in amplitude the amplitude of the pulses appearing at the output of the limiter 42, each of such larger pulses being the sum of a delayed and an undelayed pulse as already explained. Thus the output of circuit 46 is as shown in line 4. The first pulse provided by the discriminator 46, corresponding to the second pulse emitted by the transmitter in the group in question, serves to trigger the time base circuit 37 which provides an output as indicated in line 5. This causes the cathode ray beam to be deflected, in the present example, from its lowermost position on the screen toward its uppermost position.

From the outset, the received pulses are applied to the X-axis deflecting means. The first and second pulses of the group in question both appear at the same point at the bottom of the screen because deflection along the Y-axis has not yet commenced. See the trace 1 and 2. However, the third and any subsequent pulses of the group appear at some higher points on the screen as illustrated by the traces designated by the numerals 3 and 4. Traces 3 and 4 correspond, respectively, with the third and fourth pulses of the transmitted group.

Considering line 5 of Figure 2 it will be seen that the time base circuit 37 completes its cycle in ample time to be triggered by the second pulse of the next succeeding group. Since the beginning of the trace along the Y-axis is accurately synchronized with the reception of the second pulse, all subsequent pulses will occur at the exact same points (e. g., 3 and 4) on the oscilloscope screen. Thus the resulting trace, due to repetitive writing, is sufficiently brilliant to be readily distinguished from the background noise or "grass."

Due to the discrimination afforded by the time base synchronizing circuit the apparatus is highly immune to false operation due to interference signals of large amplitude. It is unlikely that two undesired pulses would occur with the proper spacing to trigger the time base.

Thus the present invention provides a radio locating system wherein the transmitter is arranged to operate at a low pulse repetition rate, thus conserving power, and the receiver is arranged to operate in synchronism with the transmitter whereby the visual indication is enhanced to reduce interference.

What I claim is:

1. A radio locating system for guiding a vehicle to a given location including transmitting means for operation at said location to radiate spaced groups of equally spaced pulses of radio frequency energy, each group consisting of three or more pulses, said pulses being emitted at a low rate of repetition, and receiving apparatus for operation on board said vehicle arranged to detect said radio frequency energy, said receiving apparatus comprising a pair of directive antennas arranged with their axes of greatest sensitivity inclined one to the other in the horizontal plane, a cathode ray tube indicating device coupled selectively to the output of each antenna for comparing their respective outputs a time base generator for causing deflection of the beam in said tube, and means coupled with said antennas and with said time base generator arranged to respond only to the second pulse of each of said groups of pulses for initiating a cycle of said time base circuit, said means comprising a delay line coupled to a pulse discriminator and arranged to delay the application of the first pulse of a given group to the input of said discriminator for a time interval equal to the spacing between successive pulses whereby the receipt of the second pulse in time coincidence with the application of said first pulse to the discriminator will cause operation of said discriminator to trigger said time base circuit.

2. A radio locating system comprising means for radiating a single radio frequency signal from the point to be located and means for detecting said single radiated signal to furnish directional information, said detecting means including a cathode ray tube indicating device, a time base generator coupled to said device, means coupled to said time base generator for synchronizing said generator with the operation of said radiating means, and means coupled with said indicating device for creating an indication on said tube of the direction to said radiating means.

3. A radio locating system for guiding a vehicle to a given location comprising a single self-controlled transmitting device for operation at said location to radiate pulses of radio frequency energy; and receiving apparatus for operation on board said vehicle arranged to receive said pulses of radio frequency energy, said receiving apparatus including a pair of directive antennas arranged with their axes of greatest sensitivity inclined one to the other in the horizontal plane, and a cathode ray tube indicating device coupled alternately to the output of each antenna; characterized in that said transmitting device is arranged to emit pulses at a low rate of repetition in the nature of spaced groups of several pulses each, and said receiving apparatus is provided with a time base circuit having an output coupled to said cathode ray tube and an input coupled to said antennas, said time base circuit being responsive to selected pulses of each group supplied thereto by said antennas for initiating a time base sweep cycle, whereby the indicating device operates in synchronism with said self-controlled transmitting device.

4. A radio locating system for guiding a vehicle to a given location comprising a single self-controlled transmitting device for operation at said location to radiate pulses of radio frequency energy; and receiving apparatus for operation on board said vehicle arranged to detect said pulses of radio frequency energy, said receiving apparatus including a pair of directive antennas arranged with their axes of greatest sensitivity inclined one to the other in the horizontal plane, and a cathode ray tube indicating device coupled alternately to an output of each antenna for comparing their respective outputs; characterized in that said transmitting device is arranged to emit said pulses in spaced groups at a low rate of pulse repetition; and further characterized in that said receiving apparatus is provided with a time base generator for causing deflection of the beam in said cathode ray tube along a first axis, the outputs of said antennas being coupled to said tube to cause deflection of said beam along a second axis, and means coupled both with said antenna outputs and with an input of said time base generator and arranged to initiate a cycle of operation of said time base generator each time a given pulse is received from one of the groups of said spaced groups of pulses, said time base generator being provided with a cycle duration such that it completes its cycle of operation after the occurrence of the last pulse of said one group of pulses but before the occurrence of a succeeding group of pulses from said pulse transmitting device, whereby respective pulses in successive groups of pulses are repeatedly displayed in superposition on the screen of said tube.

5. A radio locating system for guiding a vehicle to a given location comprising a single self-controlled transmitting device for operation at said location to radiate pulses of radio frequency energy; and receiving apparatus for operation on board said vehicle arranged to detect said pulses of radio frequency energy, said receiving apparatus including antenna means for providing signals indicative of the location of said transmitting device, and a cathode ray tube indicating device coupled to the output of said antenna means for translating said signals into a visual display; characterized in that said transmitting device is arranged to emit said pulses in spaced groups at a low rate of pulse repetition; and further characterized in that said receiving apparatus is provided with a time base generator for causing deflection of the beam in said tube, and means coupled both with the output of said antenna means and with an input of said time base generator and arranged to initiate a cycle of operation of said time base generator each time a given pulse is received from one of the groups of said spaced groups of pulses, said time base generator being provided with a cycle duration such that it completes its cycle of operation after the occurrence of the last pulse of said one group of pulses but before the occurrence of a succeeding group of pulses from said transmitting device, whereby respective pulses in successive groups of pulses are repeatedly displayed in superposition on the screen of said tube to thereby minimize the effect of random interference.

6. A radio locating system for guiding a vehicle to a given location comprising a single self-controlled transmitting device for operation at said location to radiate pulses of radio frequency energy; and receiving apparatus for operation on board said vehicle arranged to receive said pulses of radio frequency energy, said receiving apparatus including a horizontally directive antenna system, and a cathode ray tube indicating device coupled to the output of said antenna system for indicating the direction to said transmitting device; characterized in that said transmitting device is constructed and arranged to emit pulses at a low rate of repetition in the nature of spaced groups of three or more equally spaced pulses per group; and further characterized in that said receiving apparatus is provided with a time base circuit having an output coupled to said cathode ray tube and an input coupled to said antenna system, and means for responding only to the second pulse of each of said groups of pulses supplied thereto by said antenna system for initiating a time base sweep cycle, whereby the indicating device operates in synchronism with said self-controlled transmitting device.

7. A radio locating system for guiding a vehicle to a given location including a single-controlled transmitting device for operation at said location to radiate pulses of radio frequency energy, and receiving apparatus for operation on board said vehicle arranged to detect said pulses of radio frequency energy; characterized in that said transmitting device radiates said pulses in spaced groups of equally spaced pulses; and further characterized in that said receiving apparatus comprises synchronizing means responsive only to the recurrence of received pulses at said equally spaced interval, means for providing an indication of the direction to said transmitting device from said vehicle including an indicator and a directional antenna system, and a connection from said synchronizing means to said means for providing an indication for synchronizing the latter with said transmitting device only upon receipt of at least two successive pulses from said transmitting device thereby to minimize the effect of random interference.

8. A radio locating system for guiding a vehicle to a given location including transmitting means for operation at said location to radiate spaced groups of equally spaced pulses of radio frequency energy, each group consisting of three or more pulses, said pulses being emitted at a low rate of repetition; and receiving apparatus for operation on board said vehicle arranged to detect said radio frequency energy, said receiving apparatus comprising a horizontally directive antenna system, a cathode ray tube indicating device coupled to the output of said antenna system for developing a display indicative of the direction to said transmitting means, a time base generator for causing deflection of the beam in said tube, and means coupled with said antenna system and with said time base generator arranged to respond only to the second pulse of each of said groups of pulses for initiating a cycle of said time base circuit, said means comprising a delay line coupled to a pulse discriminator and arranged to delay the application of the first pulse of a given group to the input of said discriminator for a time interval equal to the spacing between successive pulses whereby the receipt of the second pulse in time coincidence with the application of said first pulse to the discriminator will cause operation of said discriminator to trigger said time base circuit.

References Cited in the file of this patent

UNITED STATES PATENTS

| | | |
|---|---|---|
| 2,403,429 | Anderson | July 9, 1946 |
| 2,403,626 | Wolff | July 9, 1946 |
| 2,427,657 | Cole | Sept. 23, 1947 |
| 2,487,759 | Kircher | Nov. 8, 1949 |
| 2,490,777 | Bryant et al. | Dec. 13, 1949 |
| 2,492,354 | Busignies | Dec. 27, 1949 |

FOREIGN PATENTS

| | | |
|---|---|---|
| 108,204 | Australia | Aug. 7, 1939 |
| 577,824 | Great Britain | June 3, 1946 |